United States Patent [19]
Kennedy

[11] Patent Number: 5,690,496
[45] Date of Patent: Nov. 25, 1997

[54] MULTIMEDIA PRODUCT FOR USE IN A COMPUTER FOR MUSIC INSTRUCTION AND USE

[75] Inventor: Stephen E. Kennedy, Dallas, Tex.

[73] Assignee: Red Ant, Inc.

[21] Appl. No.: 689,527

[22] Filed: Aug. 8, 1996

Related U.S. Application Data

[63] Continuation-in-part of Ser. No. 677,639, Jul. 8, 1996, which is a continuation of Ser. No. 254,403, Jun. 6, 1994, Pat. No. 5,533,903.

[51] Int. Cl.$^6$ .................................................. G09B 5/00
[52] U.S. Cl. .................. 434/307 R; 434/307 A; 84/610; 395/173; 395/806
[58] Field of Search .................. 434/118, 307 R, 434/309–316, 365; 360/32, 33.01, 49, 70, 77.01; 369/2, 48, 49, 59, 178, 192; 84/477 R, 478, 609–614, 622, 634–638, 645; 395/173–175, 326–330, 806, 807; 386/95; 345/122; 348/61, 578

[56] References Cited

U.S. PATENT DOCUMENTS

| | | |
|---|---|---|
| 4,474,098 | 10/1984 | Pepersack et al. . |
| 4,926,734 | 5/1990 | Rickey . |
| 4,954,969 | 9/1990 | Tsumura . |
| 5,130,966 | 7/1992 | Yoshio et al. ............... 386/95 |
| 5,153,829 | 10/1992 | Furuya et al. . |
| 5,298,675 | 3/1994 | Nishimoto et al. . |
| 5,300,723 | 4/1994 | Ito . |
| 5,313,443 | 5/1994 | Iitsuka . |
| 5,315,911 | 5/1994 | Ochi . |
| 5,375,501 | 12/1994 | Okuda . |
| 5,393,926 | 2/1995 | Johnson . |

FOREIGN PATENT DOCUMENTS

| | | | |
|---|---|---|---|
| 0 475 758 | 3/1992 | European Pat. Off. ......... | 434/309 |
| 59-167255 | 9/1984 | Japan ........................... | 434/178 |

Primary Examiner—Joe Cheng
Attorney, Agent, or Firm—David H. Judson

[57] ABSTRACT

A multimedia product for use for use in a multimedia computer to assist a student to learn to play a given musical work previously recorded on a master recording. A method of making the product is described which ensures that multimedia representations of the work are properly synchronized to the actual tempo variations, if any, in the master recording. A method of using the product for music training is also described.

15 Claims, 4 Drawing Sheets

- MUSIC NOTATION AND FONT DATA FOR ANIMATED MUSIC SCORE
- INSTRUMENT DATA
- PERFORMANCE VIDEO CLIP(S)
- MIDI DATA
- GRAPHIC HIGHLIGHT DATA
- CONTROL INFORMATION

MULTIMEDIA PRODUCT FOR USE IN A COMPUTER FOR MUSIC INSTRUCTION AND USE

RELATED APPLICATION

This application is a continuation-in-part of the co-pending application Ser. No. 08/677,639, filed Jul. 8, 1996, which is a continuation of prior application Ser. No. 08/254,403, filed Jun. 6, 1994, now U.S. Pat. No. 5,533,903.

TECHNICAL FIELD

The present invention is concerned generally with computerized methods and system for music training and more particularly to use of a computer to synchronize multiple sources of sound and images to an audio performance of a master recording to thereby instruct a student how to perform the master recording or some facsimile thereof.

BACKGROUND OF THE INVENTION

Learning to play a musical instrument is a complex and challenging task. The student is required to master several skills of interpretation and performance that pose a heavy burden on all but the most gifted students. Specifically, learning to read a musical score is a highly complex task in and of itself; relating a musical score to its performance on a musical instrument requires a great deal of interpretative skill, and relating the sound performance of a musical work to its representation in musical notation is a difficult task that requires many years of dedicated study to master. Yet, all of these skills are required to a greater or lesser degree to learn and perform new musical works.

Many students desire to play the music they hear on sound recordings: records, CD's, the radio and television. There are may well-known teaching methods used to train music students to play musical instruments; these include book lessons, piano methods and classroom training. Yet, none of these techniques focus on playing specific performances as captured in sound recordings. In traditional music lessons, the student builds musical skills by learning to play a long series of individual music works. The goal of these lessons is to perform the given work, and only eventually to build the requisite skills needed to perform new works. Only the most gifted students learn to play along with musical recordings, as none of the methods per se teach students to play from specific sound recordings. These methods generally take years to build the pre-requisite skill set needed to learn and perform new musical works. These difficult requirements make learning new musical works too slow and difficult for most students, and eventually discourages them from further acquisition of new music skills.

There is a long felt need in the field of music education to provide better training tools and methodology to help build skills necessary to play musical works.

BRIEF SUMMARY OF THE INVENTION

It is a primary object of the invention to provide computer-assisted music training.

It is a further object of the invention to provide multimedia products that assist students to play along with a given sound recording of a music performance, a so-called "master recording," to increase their musical skills.

It is another object of the invention to provide a production environment in which such multimedia products are developed and created.

It is a more particular object of the invention to provide a computer-based production environment to generate a multimedia training "file" from a given sound recording of a music performance. The training file includes one or more components that are output to a student (preferably along with the master recording itself) to assist the student in learning the master recording, or some facsimile thereof.

Another object of the invention is to use a computer to synchronize one or more of the following to a master recording: a digital video performance, an animated musical score, the animation of the performance on an instrument, and/or a MIDI version of the performance, for the purpose of music instruction.

It is still a further object of the invention to teach a student how to perform a music work using a computer in such a manner to synchronize the display of one or more types of media simultaneously: an animated music score, a performance of the work on an animated instrument, a digital movie or video of a performance of the work (e.g., by an instructor or other musician), and MIDI versions of the performance. Such media are synchronized to the sound recording of the music work, namely the master recording.

It is thus a general object of the invention to provide a multimedia product in which component parts thereof are displayed and/or performed in synchronization with a master recording.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
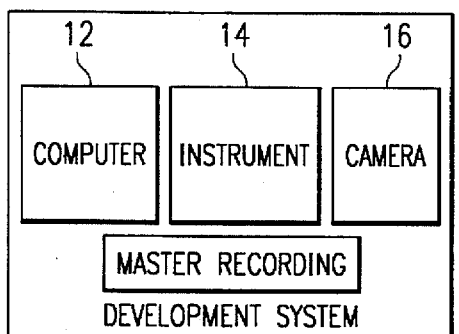
FIG. 1 illustrates a development system in which the present invention is implemented.

Referring now to FIG. 1, a computer-implemented production system is shown for developing and creating multimedia materials for use in music training. While the present invention is described in the context of such training, it should be appreciated that the methods and systems described have broader applicability and are useful in creating multimedia materials for other applications.

Development system 10 as shown in FIG. 1 implements a production environment and includes a computer 12, an electronic keyboard 14, and a video camera 16. The electronic keyboard 14 is compatible with the music instrument digital interface (MIDI) standard. If desired or necessary, the production environment may also include an electric or acoustic guitar and a source of master recordings, for the purposes to be described. As used herein, a "master recording" refers to the source material itself, which generally will comprise a given sound recording of a music performance. The musical performance is the work itself, which may or may not include the media, depending on the context.

Figure 2:
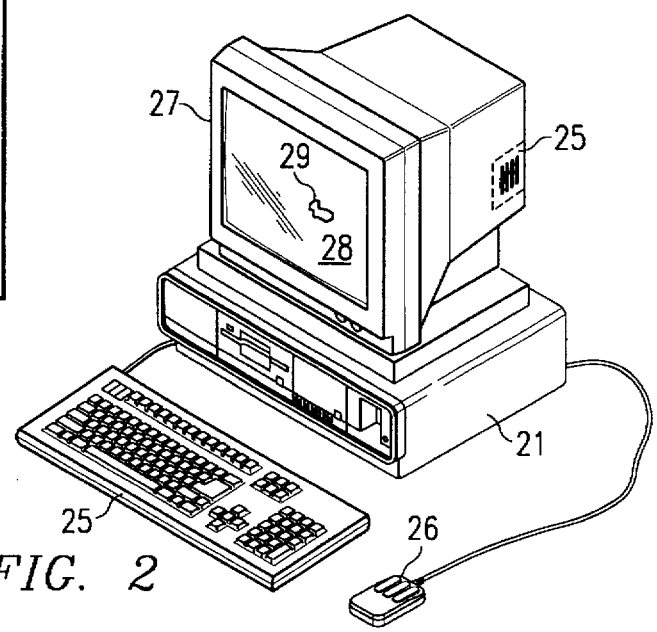
FIG. 2 illustrates a computer comprising a system unit, a keyboard, a mouse and a display.

FIG. 2 shows a block diagram of a representative computer 12, which includes a system unit 21, a keyboard 25, a mouse 26 and a display unit 27. The screen 28 of the display unit 27 is used to present a graphical user interface (GUI). The graphical user interface supported by the operating system of the computer allows the user to use a point and shoot method of input, i.e., by moving the mouse pointer 29 to an icon representing a data object at a particular location on the screen 28 and pressing on the mouse buttons to perform a user command or selection. This type of arrangement also allows the user to "drag and drop" an icon from one position to another on the screen, all in a known manner. One or more "windows" may be opened up on the computer independently or concurrently.

Figure 3:
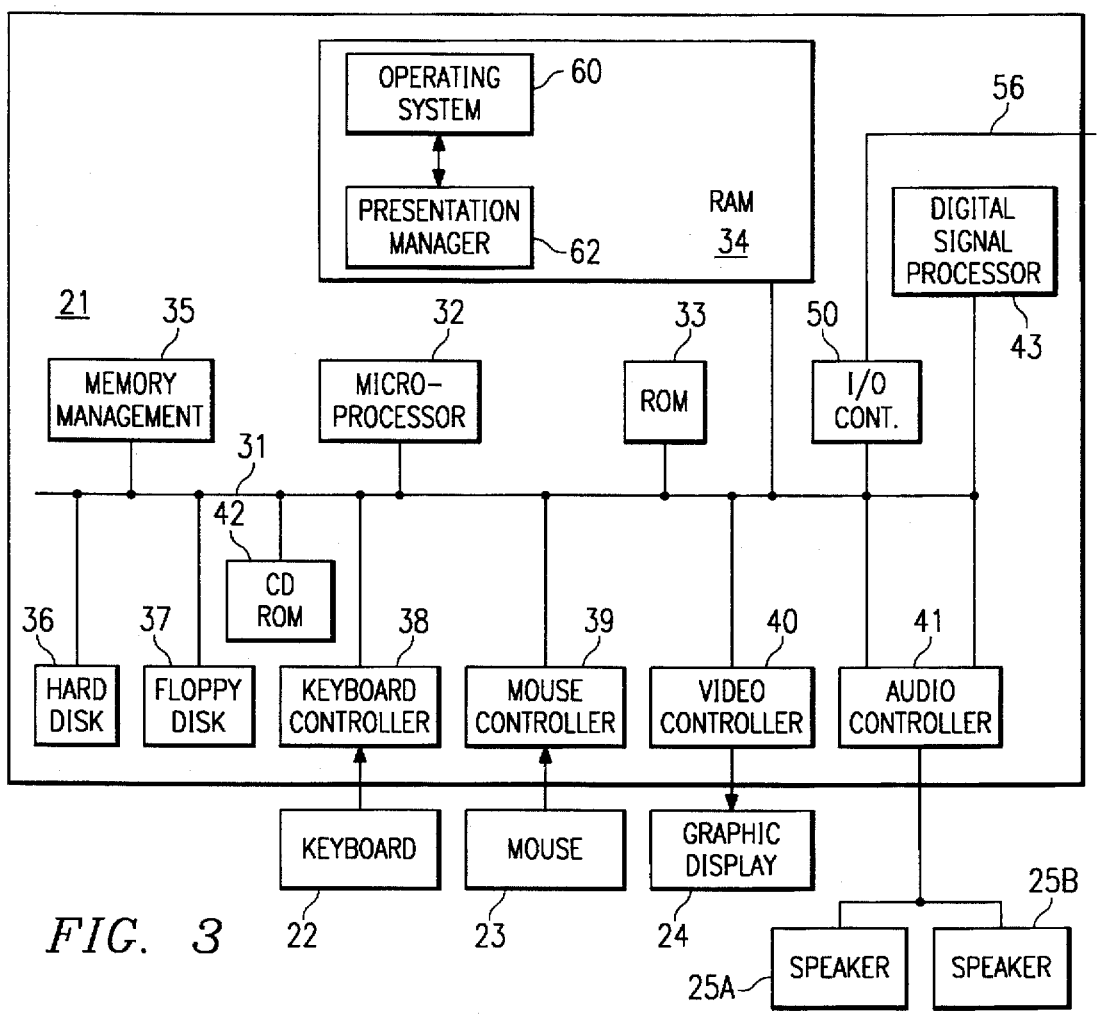
FIG. 3 is an architectural block diagram of the computer illustrated in FIG. 2.

Turning to FIG. 3, the system unit 21 includes a system bus or plurality of system buses 31 to which various components are coupled and by which communication between the various components is accomplished. The microprocessor 32 is connected to the system bus 31 and is supported by read only memory (ROM) 33 and random access memory (RAM) 34 also connected to system bus 31. The ROM 33 contains among other code the Basic Input-Output system (BIOS) which controls basic hardware operations such as the interaction and the disk drives and the keyboard. The RAM 34 is the main memory into which the operating system and application programs are loaded. The memory management chip 35 is connected to the system bus 31 and controls direct memory access operations including, passing data between the RAM 34 and hard disk drive 36 and floppy disk drive 37. The CD ROM 42, also coupled to the system bus 31, is used to store a large amount of data, e.g., a multimedia program or large database.

Also connected to this system bus 31 are various I/O controllers: the keyboard controller 38, the mouse controller 39, the video controller 40, and the audio controller 41. The keyboard controller 38 provides the hardware interface for the keyboard 25, the controller 39 provides the hardware interface for the mouse (or other point and click device) 26, the video controller 40 is the hardware interface for the display 27 and the video camera, and the audio controller 41 is the hardware interface for the multimedia speakers 23a and 25b. A modem 50 enables communication over a network 56 to other computers over the computer network.

Computers in the Apple Quadra (such as the Quadra 650) series of computers are particularly useful for implementing the production environment. In the alternative, an IBM or IBM-compatible type of computer may be used, in which case the operating system 60 would be DOS, WINDOWS 3.x, WINDOWS '95, OS/2, AIX, or any other known and available operating system. Preferably, RAM 34 supports a number of Internet access tools including, for example, an HTTP-compliant web browser 62. Known browser software includes Netscape, Netscape Navigator 2.0, Mosaic, and the like. RAM 34 may also support other Internet services including file transfer protocol (FTP).

The production environment described above is used to generate a multimedia training "file" from a master recording. The training file includes one or more components or pieces that are displayed and/or executed over a common time scale, which is preferably derived from actual tempo changes in a master recording. Such components include, without limitation, one or more of the following: the animation of a music score, a performance of the work on an animated instrument, a digital movie or video of a performance of the work (e.g., by an instructor or other musician), and a MIDI version derived from the recording, the work or the performance. The file is then made available to the student in a conventional format such as a floppy diskette, CD-ROM, via a network download, or some combination thereof, or such components may be marketed in a bundled fashion with conventional sheet music for the recording.

Figure 5:
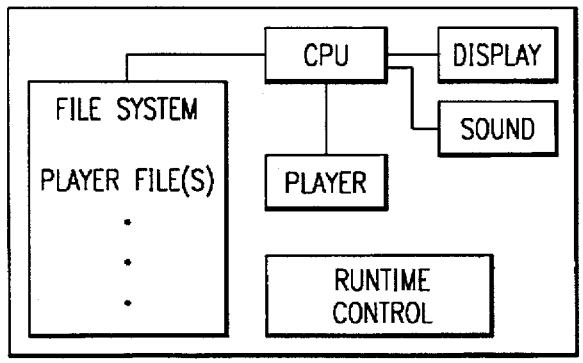
FIG. 5 is a diagram illustrating a runtime environment in which the multimedia player files are used to facilitate music training.

During a runtime operation, using a conventional multimedia computer as shown in FIG. 5, the file is output on the user's computer to assist the user to play the master recording, or some facsimile thereof. Thus, according to the invention, a computer (associated with the student) is controlled by the multimedia product to synchronize the display of one or more types of media simultaneously along with the master recording itself (which may or may not be incorporated on the product). As the student "hears" the master recording, he or she also "sees" (on the computer screen) at least some portion thereof as an animated musical score, and also "sees" how that score is played on an animated version of the instrument and/or in a performance video. Thus, when the full animated score, instrument and video are provided, the student "hears" the master recording, "sees" the teacher or other person play the actual piece, sees the relationship between the animating score notation and the master recording, and is guided or instructed about how to play the piece by showing how it is played on the animated instrument. If desired, a metric of the piece may be displayed using a beat or measure highlight over the notational score.

Figure 4:
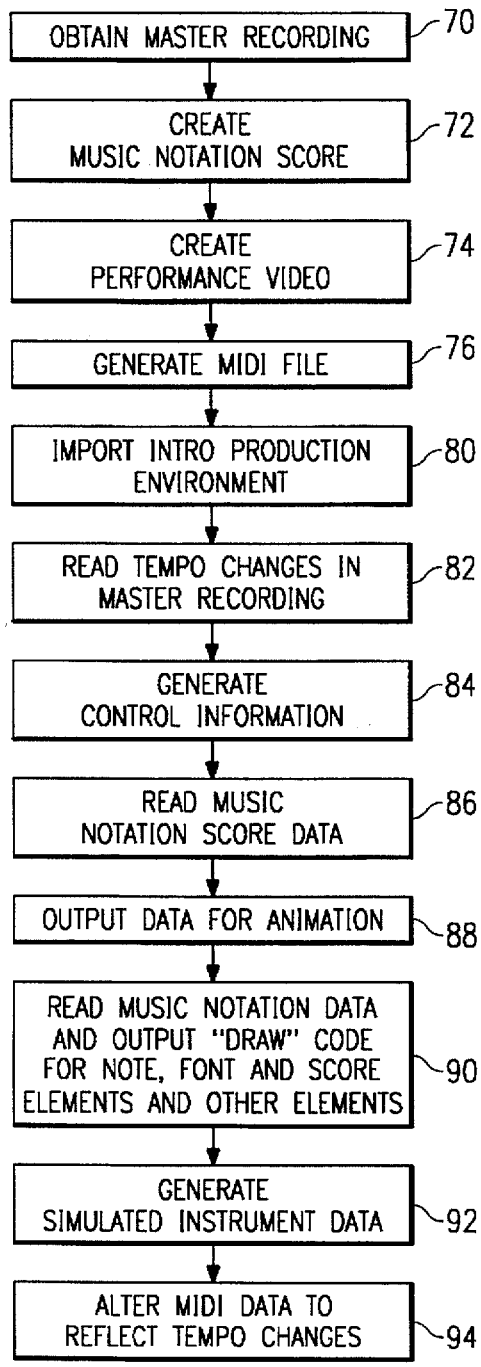
FIG. 4 is a diagram illustrating a preferred method for developing player files in the production environment of the invention.

A training file may be generated from a master recording in the manner described by the flowchart of FIG. 4.

The method begins at step 70 with a master recording of some musical performance. One or more elements of the performance, such as the tempo, meter, key, note transcription, harmonic or melodic content, etc., may or may not be known. The master recording is typically in the form of a CD, digital master, audiotape or other known media, and this recording includes a performance of a musical work that a student desires to learn and/or an instructor desires to teach. At step 72, a music notation score is created, preferably in digital form. This can be accomplished in several known ways. For example, if no information about the performance is available, a score can be created manually (e.g., by ear). This approach involves creating a sketch score that includes one or more of the following: a key identification, a tempo marking, a chord or other harmonic transcription, a note transcription for one or more instruments and/or vocal parts, and capture of any words or lyrics. This source material (in analog form) is then digitized through appropriate means (such as a scanner). Alternatively, the music performance is already transcribed in some manner and this transcription, or some part thereof, is used as the music notation score.

At step 74, a performance video of a performance of some part of the master recording is created or obtained. Such a performance video may be of several types such as a visual recording taken at the time of the master recording or by having a performer (or one or more performers) recreate the original performance or some semblance thereof and recording the results using a video recorder or similar device (such as device 16 in FIG. 1). In the context of a guitar instruction, the performance video may illustrate a simplified version of the "chords" that are played during the performance captured on the master recording, or the particular fingering style of some difficult passage, or the particular fingering of a simplified version thereof, or a combination of any of the above. The performance video merely captures a performance that is designed to be imparted to the student to assist the student in learning to play some aspect of the piece. The performance video may illustrate the precise guitar parts played by the original musicians in the master recording, or any simplified or facsimile version thereof. In the context of a piano or other keyboard instruction, the performance video may illustrate a particular fingering for some passage of the music recording, or perhaps a simplified "Big note" or other version of the piece. The performance video may capture multiple versions of the piece played by the instructor (or other person) so that the student can review versions of the piece that increase in difficulty according to some predetermined performance metric, such as rhythmic, harmonic or other degree of difficulty. If desired, one or more other images or videos may be created (or imported into the file via the Internet FTP connection or some other source).

At step 76, a MIDI file (which is a file of digital information) is generated by known means, either from scratch using sequencing software, captured during the video performance, or generated from the notation score. Both the MIDI file and the digital video may not exactly reflect the master recording in musical content and tempo. The master recording may or may not have a known tempo, and consequently the MIDI file and digital video may or may not reflect the actual tempo of the master recording or its fluctuations.

Each of the steps 72, 74 and 76 may be carried out in any ordered sequence, or at the same time. These steps are illustrated in "parallel" in FIG. 4 merely for convenience of illustration, and one or more steps may be omitted or combined depending on the nature of the source material. There is no particular ordering of these steps that is required by the invention. According to the invention, once the source materials are generated, temporal information in the original master recording is then used to synchronize how such materials are ultimately displayed back to the student. This process is now described.

At step 80, the music score, MIDI file and performance movie are imported, preferably along with a digital audio version (i.e., a performance) of the master recording, into a software production environment, called the constructor module. At step 82, the constructor reads the actual tempo changes in the master recording which are needed to coordinate the multimedia elements to the actual tempo fluctuations in the master recording, if any exist. At step 84, the constructor uses this tempo data to output a list of tempo changes that will be used to coordinate instrument and note data animation, as well as video, with the master recording. At step 86, the constructor reads the data from the music notation score and, at step 88, outputs a list of rectangles (or some similar construct) and timing data corresponding to the actual locations of the notes and meter as described in the musical score and required for the animation of the performance on the instrument. At step 89, the global time scale data generated in step 84 is used to coordinate this animation with an actual tempo of the master recording.

Figure 6:
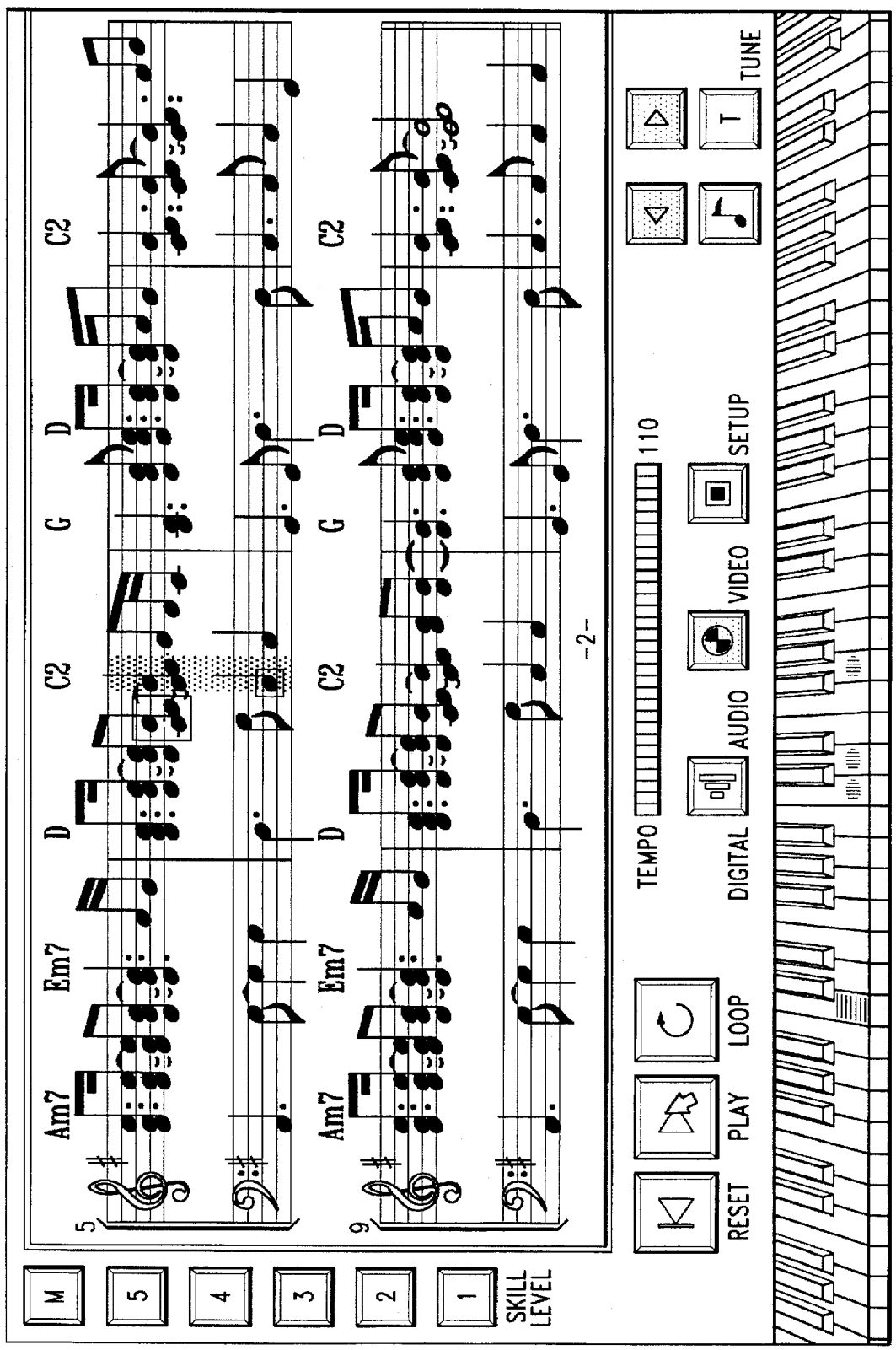
FIG. 6 is a representative screen display showing an animated music score and an animated instrument being displayed to a student during the associated audio reproduction of the master recording which corresponds to the displayed materials.

The method continues at step 90 during which the constructor module reads the music notation data input thereto and outputs appropriate "draw" code for note, font and score elements needed to present the music score and other information, such as note and beat highlight information, during playback to the student. Step 90 is thus used to create an animated music score. The score may include one or more variations of the performance on the music recording, or it may be a literal sketch score of the actual performance. The music score is said to be "animated" because, in the runtime environment, it is caused to be shown on the display as the master recording is played. The preferred embodiment of score animation is to animate the individual notes of the score and highlight the meter of the music performance, preferably using a shaded region covering a portion of the music score according to some predetermined metric, in temporal coordination with the audio performance of the score. Such animations (i.e., the beat or measure markers) move through the score in synchronization with the audio performance. This is illustrated in FIG. 6, by way of example.

Returning to the discussion of the production environment, the method continues at step 92 during which the constructor module reads the music notation data and outputs the note information for representation on an simulated instrument. This is also illustrated in FIG. 6, wherein a simulated piano keyboard is shown. During the playback, the notes of the score are shown being played on the simulated piano in an "animated" manner by having the appropriate keys lit-up or otherwise illustrated as activated as the master recording is played. A beat highlighter is also shown in the illustration.

Figure 7:
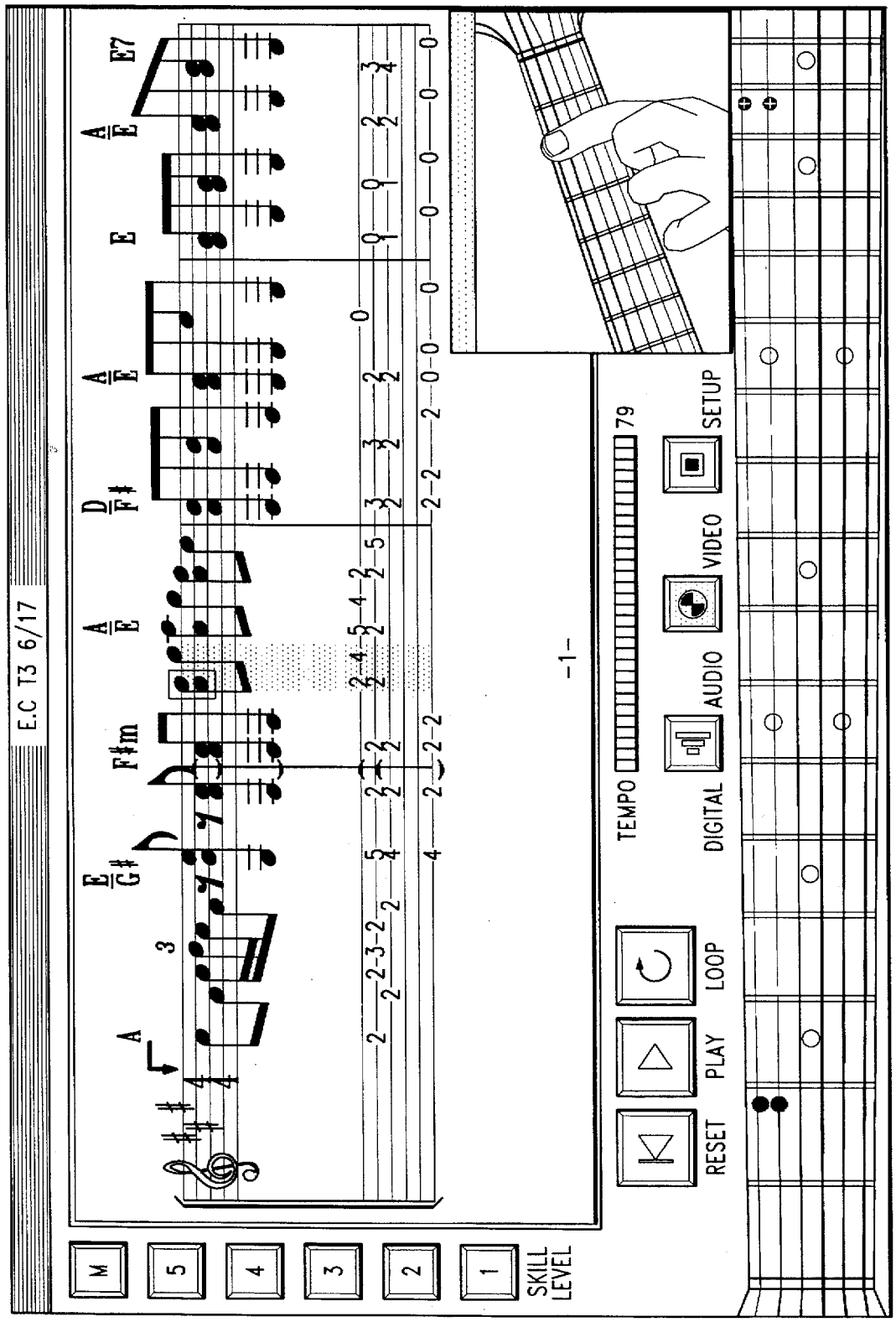
FIG. 7 is a representative screen display as in FIG. 6 showing the inclusion of a performance video within a dedicated window.

Turning back once again to a discussion of the production environment, at step 94, the MIDI data is read and the constructor alters the tempo of the MIDI file to match the tempo changes in the master recording (as determined by step 84). Thereafter, the constructor reads the digital movie data and synchronizes the timebase of the movie with the timebase for the master recording (as determined by step 84). When this resulting file is displayed during runtime as shown in FIG. 7, the student sees the performance video, the animated music score and the animated instrument, synchronized with each other, and to the master recording (if the recording is being played, which is optionally but preferred).

When the above steps are completed, the constructor outputs a player file (of digital information) containing one or more of the following components: animated score, animated instrument data, and necessary timing data to synchronize the animation of music notation display, MIDI data (which may be used, for example, if the master recording is not available during runtime), and instrument animation data, as well as a digital movie, all synchronized to the audio performance of the actual master recording. The data supported on an appropriate storage media such as a computer diskette, CD-ROM, or other suitable device, to form a multimedia product. Alternatively, the file is downloadable to another conventional storage, all in a known manner.

Thus, to the extent there are rhythm and/or tempo changes in the master recording, such changes are examined and accounted for when the score, instrument animation, performance video and/or other graphic information (or any of them) is output to the student (during runtime) in conjunction with the master recording itself. The production environment of the invention thus serves to synchronize the actual tempo track of the master recording with the one or more player file components that will be provided to the student while the master recording is played.

Figure 8:
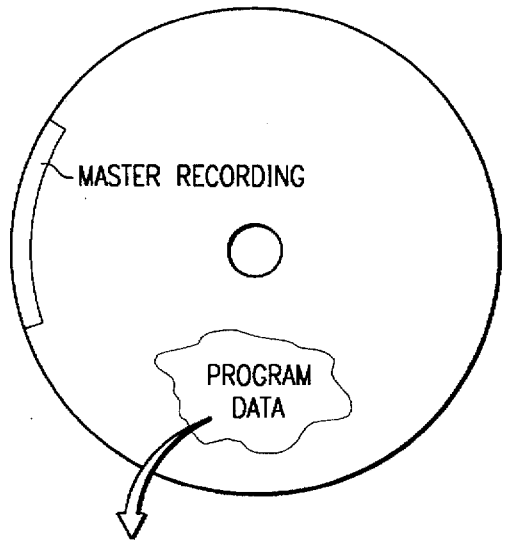
FIG. 8 is a representation of a CD-ROM product that is created by the production environment of the invention.

As seen in FIG. 8, a multimedia product (illustrated as a CD-ROM) created as a result of this production process preferably includes (a) the master recording itself, (b) music notation and associated font data creating an animated music score (or one or more variations of that score, each of which maintain the primary accent or other predetermined structure of the original work), (c) instrument data creating an animated version of the musical instrument (e.g., a piano or guitar) along with data to cause a display of how the score is played on the animated instrument, (d) one or more performance videos capturing how the music notation data is played on an actual instrument (presumably by the student), (e) MIDI data corresponding to the score notation or musical elements of the master recording, and (f) other graphic information such as beat or measure highlight data (to display a highlight marker as the master recording is played so that the student can follow along with the music), and (g) such other information (e.g., fingering annotations or other instructional notes) as may be desired.

In the preferred embodiment, the multimedia product advantageously includes the performance video (i.e., an instructor or other person playing an actual instrument) that is linked to the display of the animated instrument. As noted above, FIG. 7 illustrates the performance video displayed along with the animated instrument during the playback of the master recording. This figure also illustrates the display of the music score, as well as a beat (or other temporal) marker that overlays the music score. When the beat marker is displayed, preferably the width of that marker varies according to the width of individual measures in the score. If desired, the student may a given starting portion and a given ending portion anywhere within the music score, which is then caused to be played over and over again in a loopback manner (using the Loop button) to facilitate training of particularly difficult portions of the work. The tempo can be varied by pointing and clicking on the Tempo bar, with the resulting tempo then displayed as a number as shown. One or more variations of the work can be selected by the Skill Level buttons.

Therefore, according to the invention an instrument animation, a score animation, a performance video and one or more other graphic devices are temporally linked to an audio reproduction of a master recording. During runtime, the student preferably places his or her instrument at or near a computer. Although not meant to be limiting, it is assumed that the student has access to a personal computer like the type discussed above with respect to FIGS. 2-3. Such a computer includes a CD-ROM player or other suitable device to support the multimedia product in whatever format that product is embodied. Preferably, the student's instrument is connected electronically to the computer.

To begin a lesson, the multimedia product is obtained and placed in the computer. Using point and click controls or other conventional input means, the student is prompted to select one or more aspects of the piece, such as the identify of a particular variation, a tempo, a starting point, an ending point, a beat marker, etc. The student may also select which of the component parts of the file (such as the animated score, instrument or performance video) he or she wishes to view. Some students may only be interested in the performance video and the score itself, or the score and the animated instrument movie, or just the instrument movie or the music score, and so forth. The MIDI data can be used if the master recording is not available or not desired. The present invention contemplates display of all, or any one or more of such components as the original music recording (or even some variation thereof) is played back to the student.

Because the multimedia elements are temporally linked relative to the master recording, the tempo of these multimedia elements may be altered to play either faster or slower according to the wishes of the student, yet still remain synchronized.

While in the preferred embodiment an audio reproduction of the master recording is included in the multimedia file or product (along with the other multimedia representations), this is not required, as the invention could be implemented by having the master recording generated at the user's multimedia computer or otherwise downloaded from another source such as the Internet. Thus, according to the invention, an "article of manufacture" for use in a computer, may comprise a computer-readable storage medium having a substrate, and program data encoded in the substrate of the computer-readable storage medium. Preferably, the program data includes an audio reproduction of the musical work (preferably a digital audio of the master recording or perhaps a MIDI version), and, and an animated music score of the musical work synchronized to the audio reproduction of the musical work. The program data may also include the animated instrument, and the performance video, as well as one or more graphic devices (such as a beat marker). In any case, the "computer-readable storage medium having a substrate" of the "article of manufacture" may be a separate physical media such as a CD-ROM or floppy diskette, or it may refer to the computer's hard drive, cache or other available memory. Depending on the media used, the program data may be included in the actual product (as in the case of a CD-ROM or floppy) in the first instance, or it may be incorporated at a particular time (as would be the case if the program data or portions thereof were downloaded via the Internet).

What is claimed is:

1. An article of manufacture for use in a computer having a processor, a display and an associated audio device to assist a student to learn to play a given musical work previously recorded on a master recording, comprising:

a computer-readable storage medium having a substrate; and program data encoded in the substrate of the computer-readable storage medium, wherein the program data comprises:

the master recording;

a music score representing a version of the musical work as previously recorded on the master recording the music score having notational information useful in assisting the student to learn to play the musical work:

control data for controlling output on the display of a set of one or more visual indicators that highlight the notational information in the music score as the music score is displayed on the display and the master recording is played on the audio device; and timing data for synchronizing the highlight of the notational information in the music score to playback of the master recording.

2. The article of manufacture as described in claim 1 wherein the program data further includes a video of a performance of a portion of the musical work as played on an instrument, wherein the timing data also synnchronizes output of the performance video in a window on the display to the playback of the playback of the master recording.

3. The article of manufacture as described in claim 1 wherein the program data further includes a simulated musical instrument display on which at least a portion of the musical work is displayed as a series of finger placements, wherein the timing data also synchronizes the series of finger placements on the simulated musical instrument display to the playback of the master recording.

4. The article of manufacture as described in claim 1 wherein the computer-readable storage medium is selected from the group consisting of a CD-ROM, a diskette, a hard drive, and a cache.

5. The article of manufacture as described in claim 1 wherein at least a portion of the program data is downloaded to the computer.

6. The article of manufacture as described in claim 1 wherein the set of one or more visual indicators comprises a note highlight.

7. The article of manufacture as described in claim 1 wherein the set of one or more visual indicators comprises a beat marker.

8. The article of manufacture as described in claim 7 wherein the beat marker has a width that varies as a function of a layout of the notational information in the music score.

9. The article of manufacture as described in claim 1 wherein the notational information in the music score includes music notes.

10. The article of manufacture as described in claim 1 wherein the notational information in the music score includes music score elements.

11. The article of manufacture as described in claim 1 wherein the program data comprises a variation of the music score representing another version of the musical work as previously recorded on the master recording.

12. An article of manufacture for use in a computer having a processor, a display and an associated audio device to assist a student to learn to play a given musical work previously recorded on a master recording, comprising:

a computer-readable storage medium having a substrate; and program data encoded in the substrate of the computer-readable storage medium, wherein the program data comprises:

a music score representing a version of the musical work as previously recorded on the master recording, the music score having notational information useful in assisting the student to learn to play the musical work;

control data for controlling output on the display of a set of one or more visual indicators that highlight the notational information in the music score as the music score is displayed on the display and the master recording is played on the audio device; and timing data for synchronizing the highlight of the notational information in the music score to playback of the master recording.

13. The article of manufacture as described in claim 12 wherein the set of one or more visual indicators includes a note highlight.

14. The article of manufacture as described in claim 12 wherein the set of one or more visual indicators includes a beat marker.

15. The article of manufacture as described in claim 12 wherein the set of one or more visual indicators include at least one note highlight and a beat marker.

* * * * *